March 31, 1931.   H. W. HELMS   1,798,736
COVER FOR DUMP BODY VEHICLES
Filed July 5, 1928   3 Sheets-Sheet 1

Inventor.
Harry W. Helms.
by Burton & Burton
his Attorneys.

Witness
N. T. McKnight

March 31, 1931.   H. W. HELMS   1,798,736
COVER FOR DUMP BODY VEHICLES
Filed July 5, 1928   3 Sheets-Sheet 2

Inventor:
Harry W. Helms
by his Attorneys

March 31, 1931.  H. W. HELMS  1,798,736
COVER FOR DUMP BODY VEHICLES
Filed July 5, 1928  3 Sheets-Sheet 3
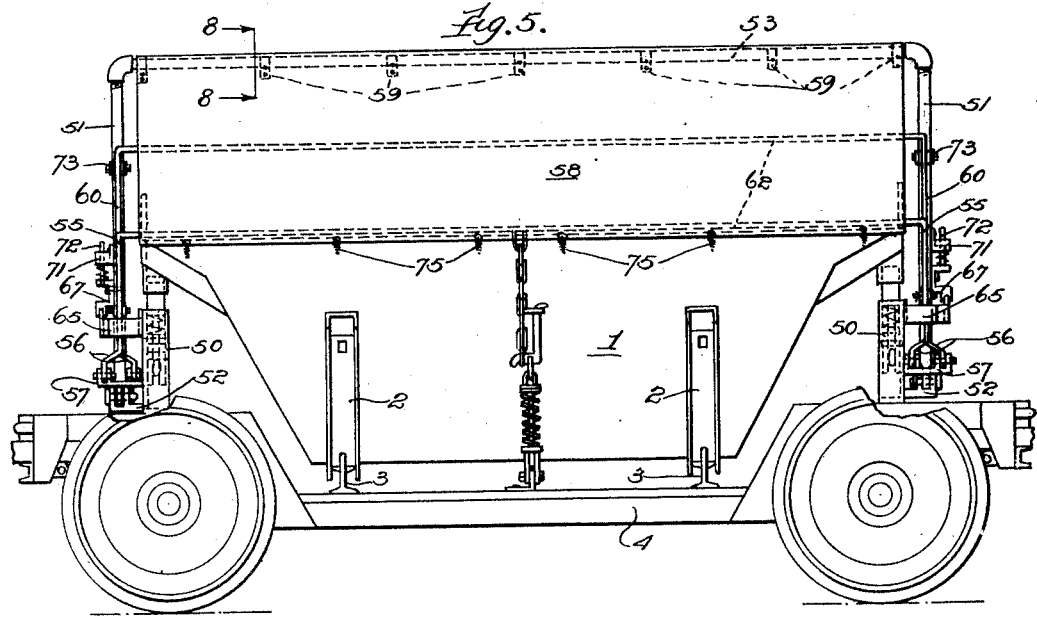
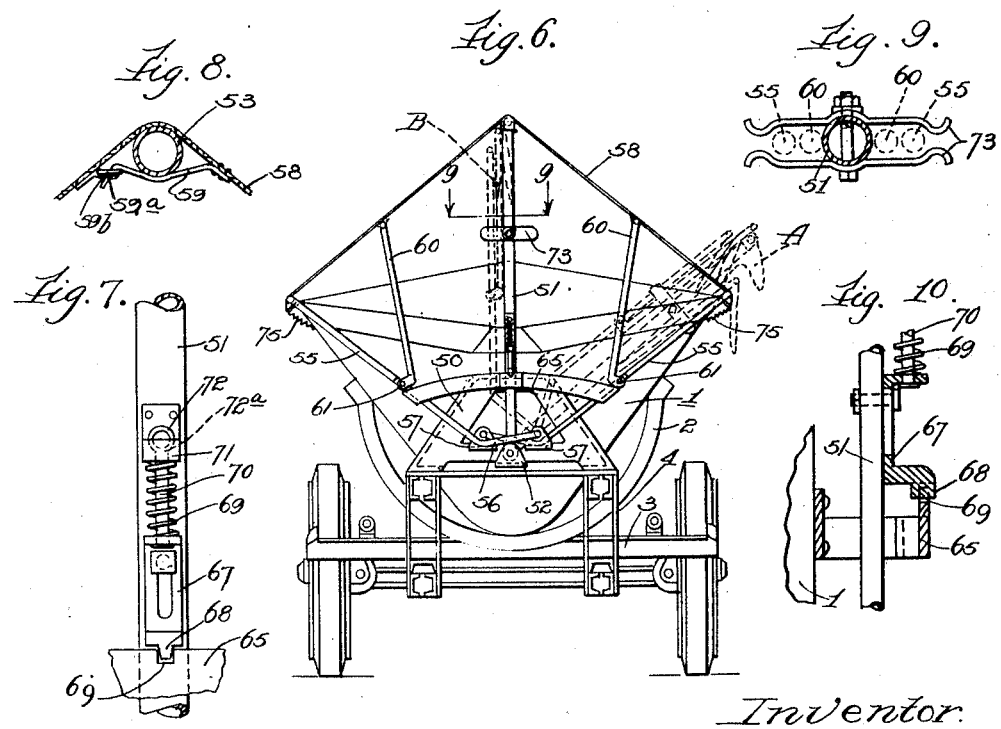
Inventor:
Harry W. Helms
by his Attorneys Patented Mar. 31, 1931

1,798,736

UNITED STATES PATENT OFFICE

HARRY W. HELMS, OF EDGERTON, WISCONSIN, ASSIGNOR TO HIGHWAY TRAILER COMPANY, OF EDGERTON, WISCONSIN, A CORPORATION OF WISCONSIN

COVER FOR DUMP-BODY VEHICLES

Application filed July 5, 1928. Serial No. 290,365.

The present invention relates to dump body vehicles of the type designed for refuse collection and similar purposes, and more particularly to covering means for enclosing the load carrying space of the body. The primary object of this invention is to provide a cover of improved and simplified construction which may be cheaply manufactured. A further object is to provide an improved cover construction which may be readily and easily manipulated to permit free and unobstructed dumping action of the body when the same is rolled or tilted laterally for discharging its load. Another object is to provide an improved cover construction which may be easily manipulated to permit exposure of a limited portion of the load-carrying space of the body at will. It consists in certain features and elements of construction herein shown and described, as indicated by the claims.

In the drawings:

Figure 5 is a view in side elevation of a vehicle embodying a further modification of my invention.

Figure 6 is an end view showing the covers in dotted lines at two separate possible positions of opening.

Figure 7 is an enlarged fragmentary detail view of locking mechanism.

Figure 8 is a transverse sectional view taken as indicated at line 8—8 on Figure 5.

Figure 9 is a horizontal sectional view taken as indicated at line 9—9 on Figure 6.

Figure 10 is a vertical section through the locking mechanism shown in Figure 7.

Figure 1:
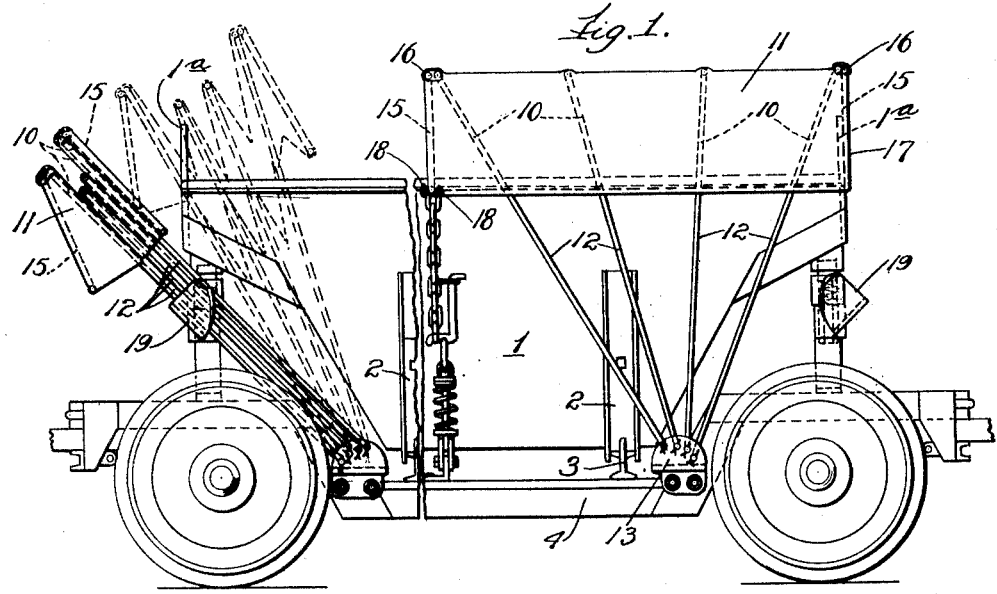
Figure 1 is a view in side elevation of a vehicle provided with a cover embodying the present invention; the view being broken for condensation and at one side of the break showing the cover in closed position, while at the other side showing the cover in collapsed position; the dotted lines indicating an intermediate position during the collapsing of the cover.

As illustrated in the drawings, the vehicle is of a conventional design and includes the usual upwardly open hopper body, 1, mounted on curved rockers, 2, which are carried on transversely extending rails, 3, secured to the vehicle main frame, 4. This rocker support for the body permits the same to be rolled laterally to either side for discharging its load. The covers of the present invention are mounted independently of the body so as not to alter its normal center of gravity, and are movable to a position at which the body may have free and unobstructed dumping action. It is of course to be understood that the body is normally locked to the frame in an upright position by any suitable locking mechanism.

Figure 2:
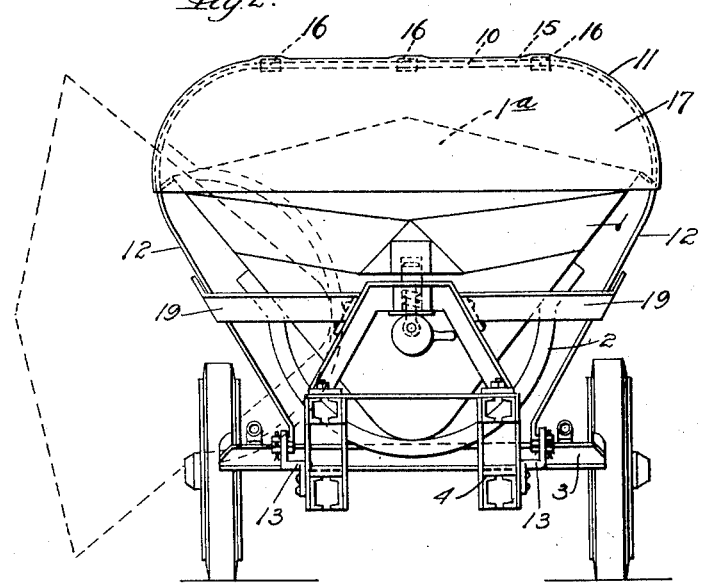
Figure 2 is an end view of the vehicle, with the cover in closed position; the forward part of the vehicle chassis being omitted.

The body cover shown in Figures 1 and 2 is composed of two sections which are longitudinally movable to enclose opposite portions of the load-carrying space of the body. When these cover sections are extended in body covering position they abut each other adjacent the longitudinal center of the body. It may be desired that these cover sections form a closer joint at their place of meeting, and for this purpose, the adjacent ends of said cover sections may be designed to afford partial telescoping of one in the other when extended in body covering position. Each of the cover sections includes a plurality of spaced, transversely disposed, bowed ribs, 10, to which is secured a sheet of flexible material, 11, such as canvas, rubber coated fabric or the like. This sheeting extends on opposite sides slightly below the edge of the body. The ribs are provided with supporting arms, 12, on opposite sides of the body, herein shown as being continuations thereof, but it is apparent that these arms need not be integral with the ribs. The lower ends of the arms, 12, are pivotally mounted in fixtures, 13, secured to the vehicle frame, 4. It is preferable that each arm be separately pivoted in spaced relation to the others so that the arms will lie one upon the other when the cover is collapsed as shown at the left end of the vehicle in Figure 1. Furthermore the pivots for the supporting arms must be so positioned as to permit their respective bowed ribs to clear the tapered end, 1ª, of the body when the cover section is collapsed. The ribs and supporting arms are preferably of light weight construction such as wood or metal tubing, or parts of each. The end 1ª of the body may be smoothly rounded so that the portion of the top covering, 11, which buckles between the ribs when the cover collapses may be pulled over the end. The ribs, 10, might be disposed in parallel vertical planes, but it is desirable to align them in the planes of their respective arms, 12, to secure a more compact unit when the cover is collapsed.

Auxiliary bowed ribs, 15, are connected by strap hinges, 16, to the end ribs, 10, of each cover section; this hinge support allows the ribs to assume vertical positions when in body covering position. The top covering, 11, extends beyond the sides of the ribs, 10, and is secured to the ribs, 15, which tend to keep the flexible top 11, outstretched. The rear end of each cover section is provided with a skirt portion, 17, secured to the end rib, 15; this skirt end abuts against the end portion, 1ª, of the body, in closed position, and serves to limit the forward movement of the cover section.

The supporting arm pivotal connections are positioned off center to throw the greater part of the weight of the cover toward the opposite end of the body (when in closed position) and this will normally maintain the cover in such position, and as it requires but a small additional force to hold it in extended position, I provide the usual button fasteners, 18, on the body to engage the edge of the flexible cover adjacent rib, 15, which also tends to keep the cover stretched taut.

The cover sections are supported in collapsed position by laterally extending arms, 19, on opposite sides of the body, adjacent the ends. These arms are preferably inclined at the angle at which the supporting arms, 12, assume in collapsed position, at which position the entire cover section is beyond the end of the body, 1, so that said body may be rolled to and from discharging position without hindrance by said cover sections, as illustrated in the drawings.

Figure 3:
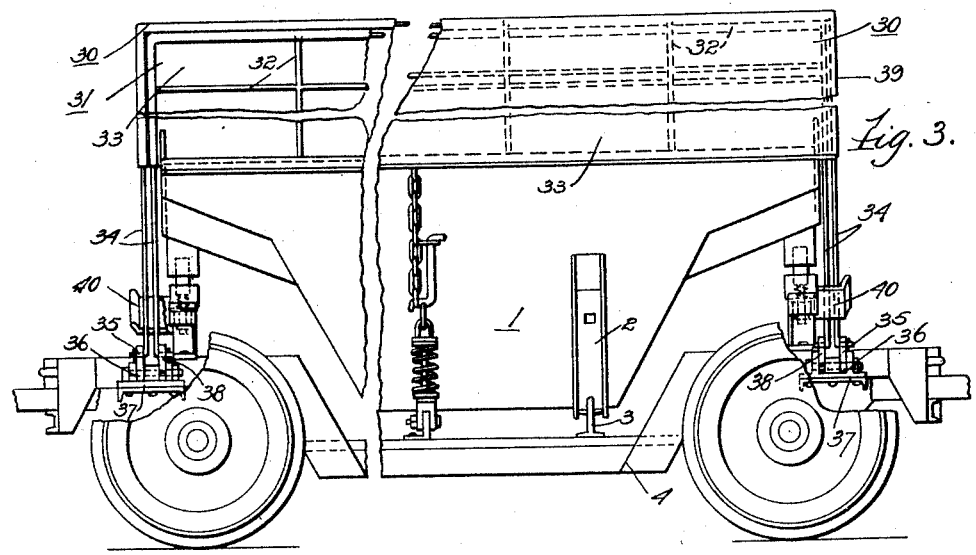
Figure 3 is a view in side elevation provided with a cover of modified construction, the view being broken for condensation; at one side of the break showing the cover in closed position, and at the other side of the break showing the cover sections telescoped one in another to expose a portion of the load-carrying space of the body.
Figure 4:
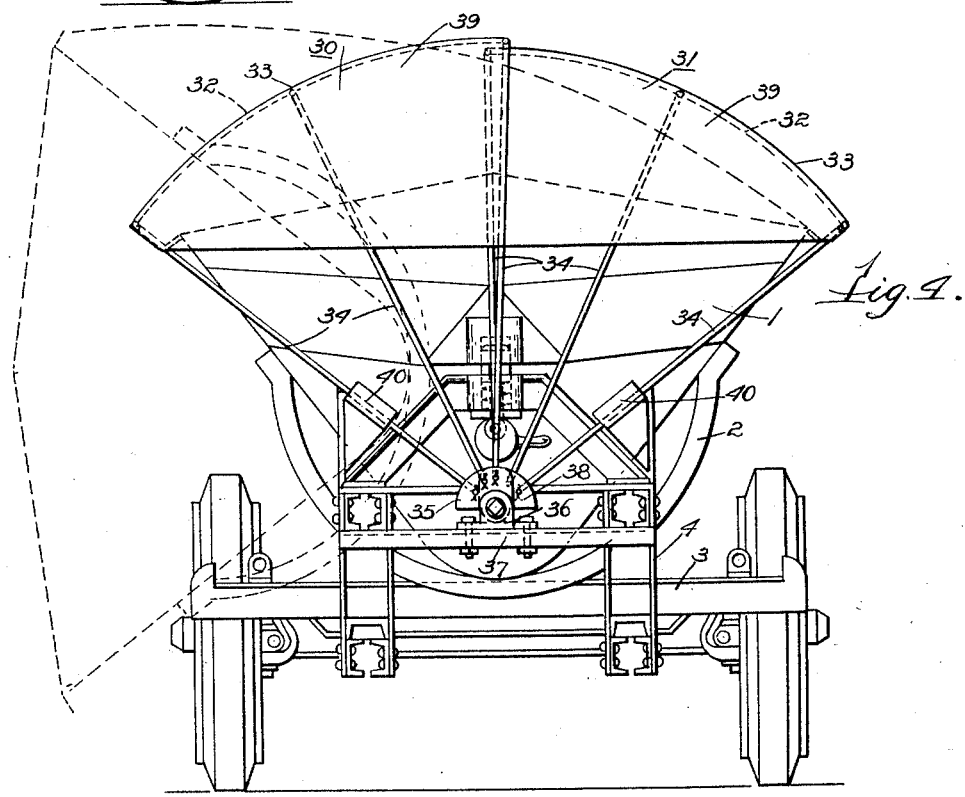
Figure 4 is an end view of the vehicle provided with a modified cover construction with the cover shown in closed position; the forward end of the chassis being omitted.

In the modification shown in Figures 3 and 4, the cover comprises two arcuate sections normally extending longitudinally over opposite portions of the load-carrying space of the body, 1, in closed position and adapted to be telescoped one within the other, or one over the other in opening; and for convenience they may be termed outer section, 30, and inner section, 31. The outer cover section, 30, is formed about a radius slightly larger than the inner section, 31, to afford proper clearance between them in their telescopic movements. Each cover section is provided with a skeleton frame, 32, of any suitable light weight construction, to which is secured a light weight covering, 33, such as canvas, or the like, or even light weight sheet metal. The cover sections are each provided with supports at the ends of the body, which may consist of single members, or as herein shown as several radially extending supporting members, 34. The supporting members of the outer section are secured to a plate, 35, which is pivotally supported in a mounting bracket, 36, secured to a cross member, 37, on the main frame, 4. The supporting members of the inner section are positioned nearer the body than the members of the outer section, and are connected to a plate, 38, which is coaxially pivoted with plate, 35, in the bracket, 36, between said plate, 35, and the body. Since the cover sections swing about a common pivot or center, they travel in true arcs and insure proper telescoping relation to each other so as to permit either cover section to be freely moved to the opposite side of the body. Due to the pivotal support for these cover sections being substantially central with respect to the body, the cover sections are necessarily unbalanced and normally tend to assume positions over either side of the body as clearly shown in the drawings.

The respective cover sections, 30 and 31, are designed so as to extend beyond the center of the body when in closed position, resulting in a partial overlapping of the outer cover section, 30, on the inner section, 31, and providing an effective closure. The ends of each cover section are also enclosed by sheet material, 39, preferably the same as the top, 33, extending somewhat below the edges of the body.

These cover sections are supported in closed position or limited in their extreme opening movements by stop brackets, 40, on the main frame, 4, adjacent the ends of the body, engaging the supporting members, 34, of said cover sections, as may be seen in the drawings. Both of the cover sections are arcuately formed with a radius large enough, so that when the covers are both telescopically positioned on either side of the body, said body may clear the cover sections as it is rolled laterally (to the side opposite said covers) to discharge its load; the path of travel of an edge of the body in one direction being indicated by dotted lines in Figure 4.

In the present construction either cover section may be quickly and easily pushed to the opposite side of the body to uncover a portion of its load-carrying space. It will be understood that more than two telescopically arranged cover sections may be employed without departing from the spirit and scope of my invention.

A further modfication is shown in Figures 5 to 10, in which a single cover extends continuously across the body, 1, and is adapted to be collapsed at will, transversely of said body for exposing its load-carrying space. As shown in the drawings, a cast A-frame, 50, is mounted on the main frame, 4, at each end of the body, carrying suitable mechanism for locking the body in upright position. At each end of the body beyond the A-frame is a standard, 51, which has its lower end pivotally mounted centrally of the vehicle in an offset bracket, 52, integral with the A-frame, 50. The upper ends of the standards are connected together by a ridge pole, 53, extending over said body and carried at a height to permit the body to clear the same when it is tilted to dumping position. The pivotal support for said standards permits swinging the same with the ridge pole as a unit to either side of the body.

At each end of the body, on opposite sides of the standard are laterally extending cover-supporting members, 55, lying proximate the vertical planes of the standards and having at their lower ends, laterally offset portions, 56. These offset portions of the members, 55, extend from opposite sides past the standards with their extreme ends pivotally mounted in brackets, 57, at opposite sides of the vehicle. These brackets, 57, may be offset from and integral with the A-frames, 50. A covering, 58, of flexible sheet material, such as canvas, is disposed across the body over the ridge pole, 53, and connected to the upper ends of the supporting members, 55. Preferably, the covering is secured to the ridge pole to assist folding and positioning the same when the cover is collapsed, and for this purpose I provide straps, 59, extending around the underside of the ridge pole. One end of each strap is fixed to the covering, the other end being detachably connected with a buckle, 59ª, secured to the covering on the opposite side of the ridge pole. This detachably strap connection permits complete removal of the covering from the body, which may be desirable at times.

The cover proper may be collapsed in two separate distinct arrangements to permit the body to be tilted for discharging its load. One of the arrangements consists in collapsing the cover at either side of the body by swinging the arms (on the side toward which the body is to be dumped), upwardly against the standards for collapsing a part of the cover and then collapsing the other part by continuing the swinging of said arms together with the standards to the opposite side of the body in a folded position as indicated by dotted lines at A in Figure 6. Because the ridge pole when in upright position normally clears the path of travel of the body, and since the pivotal support for either supporting member is on the side of the vehicle opposite to that at which it extends in cover-closing position, the ridge pole and upper ends of the supporting members, 55, project laterally beyond the body in cover-collapsing position, thus substantially removing the flexible covering from the path of travel of the body.

Any number of supporting members may be provided, but to avoid complication of pivotal supports, and for simplicity, I prefer to provide auxiliary supporting members, 60, having their lower ends pivoted at 61, to the supporting members, 55, with their upper ends connected to an intermediate portion of the covering, 58. The respective supporting members, 55, and 60, at the ends of the body, co-operate in pairs and are connected together by longitudinally extending reinforcing members, 62, secured to the covering. These reinforcing members support and assist in folding the covering as well as tend to keep it taut in body covering position. As may be seen from the drawings, the auxiliary supporting members permit collapsing the cover very compactly by reducing the size of pockets formed by the covering between adjacent supporting members, thus further insuring free and unobstructed dumping action of the body.

A yoke, 65, extends transversely of the body for guiding the supporting members and standards in their swinging movements. This yoke is preferably integral with the A-frame, 50, and has the outer ends thereof closed and formed to act as stops for limiting the movement of the supporting members when swung to one side of the body. The standards with the ridge pole may be fixed in upright position in body-covering position of the cover by locking mechanism, comprising a bracket, 67, slidably mounted for a limited longitudinal movement on the standard, the lower end of the bracket being provided with a dog, 68, adapted to yieldingly engage in a notch, 69, in the upper edge of the yoke, 65, for locking the standard in place, by a tension spring, 69, carried on a bolt, 70, connecting the bracket to a clip, 71, fixed to the standard. The upper end of the bolt is provided with a handle, 72, seated in recess, 72ª, in the clip, 71, when in locking position, and adapted to be pulled upwardly against the reaction of spring, 69, and seated across the top of clip, 71, for holding the spring compressed and the dog, 68, retracted to permit free pivotal movement of the standard.

The other arrangement for collapsing the cover, consists in leaving the standard locked in upright position, and swinging the supporting members, 55 and 60, up against the standard in the position indicated by dotted lines at B, in Figure 6. Releasable spring clips, 73, are secured to the standard for engaging the supporting members and locking them in cover-collapsing position, illustrated diagrammatically in Figure 9. In this arrangement it will also be seen that the auxiliary supporting members, 60, are important in that they reduce the depth of folds or pockets of the covering when in collapsed position, obviating possible obstruction of the body in its dumping movement.

The arrangement of the pivots for the supporting members is such that in body covering position said members tend to remain in closed position by gravity, but as a vehicle is subjected to a certain amount of vibration in travel, it is desirable to provide fasteners, 75, of a suitable type for securing the cover to the edges of the body. Instead of the separate pivots for supporting members and for further simplicity, it may be desirable that these members be pivoted on the same axis as the standard.

In the present construction shown in the drawings, either side of the body, 14, may be exposed at will, independently of the other, and it is to be understood that even a more limited opening may be provided for when using a number of auxiliary supporting members by collapsing the portion directly adjacent the standard and maintaining this position by means of the spring clips, 73, engaging the auxiliary supporting members.

I claim:—

1. In a vehicle having a main frame and an upwardly open laterally tiltable dump body mounted thereon, a collapsible cover including two sections for normally enclosing opposite portions of the load-carrying space of the body, and supporting members for each cover section, having their lower ends connected to fixtures on the frame for permitting movement of either cover section at will into and out of body covering position.

2. In a vehicle having a main frame and an upwardly open laterally tiltable dump body mounted thereon, a collapsible cover adapted to be extended over the load-carrying space of the body, and supporting members for said cover, connected to fixtures on the frame and adapted to be folded together for causing said cover to collapse.

3. In a vehicle having a main frame and an upwardly open laterally tiltable dump body mounted thereon, a cover for said body including a standard at each end thereof mounted on the frame, a ridge pole extending over the body and connecting said standards, a pair of arms pivotally mounted on the frame at their lower ends and extending on opposite sides of each standard, and a covering of sheet material extending over the ridge pole and connected to said arms; the cover supporting arms of the respective ends extending parallel to each other, and adapted to cooperate in pairs independently of the others, whereby either or both pairs of supporting members may be swung against the standards, collapsing said cover and exposing the corresponding load-carrying space of the body.

4. In the combination defined in claim 3, auxiliary supporting members pivotally connected to said supporting arms and engaging an intermediate portion of said covering, whereby to form relatively shallow pockets of said covering when in collapsed position to substantially clear the path of travel of said body in its dumping operation.

5. In a vehicle having a main frame and an upwardly open laterally tiltable dump body mounted thereon, a cover therefor mounted independently of the body, comprising a standard at each end of said body, a ridge pole extending over the body and connecting said standards, cover supporting members at each end of the body pivotally mounted on the frame at their lower ends and extending on opposite sides of the standards, and a covering of flexible sheet material extending over the ridge pole and connected to the supporting members, the lower ends of said standards being hingedly mounted on the main frame, whereby said standards and supporting members may be folded together in cover-collapsed position at either side of the body to permit said body to be tilted in the opposite direction for discharging its load.

6. In the combination defined in claim 5, means for locking said standards in upright position.

7. In a vehicle having a main frame and an upwardly open laterally tiltable dump body thereon, a cover for the body including a plurality of supporting members at each end of the body and carried by the frame independently of said body, and a covering of flexible sheet material connected to the supporting members, said members being movable toward each other to cause the cover to collapse transversely of the body.

8. In a vehicle having a main frame and an upwardly open laterally tiltable dump body mounted thereon, a cover comprising two collapsible sections for enclosing opposite portions of the load carrying space of the body, supporting members for each of said cover sections having their lower ends mounted on the main frame below the upper edge of said body and a flexible covering secured to said members, said cover sections being movable to collapsed position or extended over the body by the relative movement of the supporting members.

9. In a vehicle having a main frame and an upwardly open laterally tiltable dump body mounted thereon, a cover for the body including a plurality of supporting members pivotally connected to the main frame at each end of the body below the upper edge of said body and independently thereof, and a covering of sheet material connected to the supporting members, said members being adapted for swinging about their pivots for exposing the load carrying space of the body.

10. In a vehicle having a main frame and an upwardly open laterally tiltable dump body mounted thereon, a cover for the body including two cover sections for enclosing opposite portions of the load carrying space of the body, each section comprising a plurality of supporting members connected to the frame at each end of the body below the upper edge of said body and movable independently thereof, and a covering of sheet material connected to said members and movable therewith transversely of the body for exposing the load carrying space thereof.

11. In a vehicle having a main frame and an upwardly open laterally tiltable dump body mounted thereon, a cover for the body including two sections for enclosing opposite portions of the load carrying space of the body, each section including a plurality of supporting members pivotally mounted on the main frame adjacent the ends and independently of the body, and a covering of flexible sheet material connected to said members, said members of each section being adapted to be folded together for causing collapse of the flexible covering to expose the load carrying space of the body.

12. In a vehicle having a main frame and an upwardly open laterally tiltable dump body mounted thereon, a cover for enclosing the load carrying space of the body, and means for supporting the cover independently of the body and adapted to move said cover laterally beyond said body to afford unobstructed access to the load carrying space thereof, to permit tilting of said body for discharging its load.

13. In a vehicle having a main frame and an upwardly open laterally tiltable dump body mounted thereon, a cover for enclosing the load carrying space of the body, and means for supporting the cover independently of the body including a plurality of supporting members pivotally connected to the frame and adapted to swing said cover laterally clear of the body to afford unobstructed access to the load carrying space thereof, and to permit tilting of said body for discharging its load.

14. In a vehicle having a main frame and an upwardly open laterally tiltable dump body mounted thereon, a cover for enclosing the load carrying space of the body, and means for supporting the cover independently of the body including a plurality of supporting members pivotally connected to the frame at each end of the body and arranged for swinging said cover in a transverse direction laterally clear of the body to afford unobstructed access to the load carrying space thereof, and to permit tilting of the body in the opposite direction for discharging its load.

15. In a vehicle comprising a main frame and an upwardly open laterally tiltable dump body mounted thereon, a cover including two cover sections for enclosing opposite portions of the load carrying space of the body, each of said cover sections having a plurality of supporting members pivotally connected to the frame independently of the body, and a flexible covering connected to said members, said members being foldable toward each other to cause collapse of said flexible covering to afford unobstructed access to the load carrying space of the body.

16. In a vehicle having a main frame and an upwardly open laterally tiltable dump body mounted thereon, a cover for enclosing the load carrying space of the body including a plurality of supporting members pivotally connected to the frame at each end of the body and independently thereof, and a covering of flexible sheet material connected to said members, said members being foldable toward each other in a transverse direction for causing collapse of said covering and adapted to be swung as a unit to one side of the body to afford unobstructed access to the load carrying space thereof.

HARRY W. HELMS.